DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 796

T909,021

CIGARETTE FILTER

John E. Kiefer, Proffit Acres, Kingsport, Tenn. 37663, and Robert C. Mumpower II, 2104 King Mill Pike, Bristol, Va. 24201

Filed Aug. 24, 1972, Ser. No. 283,459

Int. Cl. A24b *15/02;* A24d *1/06*

U.S. Cl. 131—267

No Drawing. 6 Pages Specification

This invention relates to a new and improved cigarette filter made from a crimped textile tow. The fibers within the filter are coated with a solution of glycerol and poly(ethylene glycol). The function of the coating, or additive, is to increase the efficiency of the filter for removing tar and nicotine from cigarette smoke. By appropriate choice of glycerol and poly(ethylene glycol) concentration on the fiber, the amounts of both tar and nicotine delivered by a filter cigarette can be adjusted over a significant range.